United States Patent
Takahashi

(10) Patent No.: US 8,462,361 B2
(45) Date of Patent: Jun. 11, 2013

(54) PRINT CONTROL WITH SINGLE-BIT AND MULTI-BIT RASTERIZATION

(75) Inventor: Masakazu Takahashi, Kawasaki (JP)

(73) Assignee: Canon Kabushiki Kaisha, Tokyo (JP)

(*) Notice: Subject to any disclaimer, the term of this patent is extended or adjusted under 35 U.S.C. 154(b) by 1288 days.

(21) Appl. No.: 11/865,185

(22) Filed: Oct. 1, 2007

(65) Prior Publication Data

US 2008/0094651 A1 Apr. 24, 2008

(30) Foreign Application Priority Data

Oct. 24, 2006 (JP) .................................. 2006-289200

(51) Int. Cl.
*G06F 3/12* (2006.01)
*G06F 15/00* (2006.01)
*G06K 1/00* (2006.01)

(52) U.S. Cl.
USPC ............................ 358/1.13; 358/1.9; 358/1.15

(58) Field of Classification Search
None
See application file for complete search history.

(56) References Cited

U.S. PATENT DOCUMENTS

| 2003/0076523 | A1  | 4/2003  | Ito et al. |
| 2003/0193534 | A1* | 10/2003 | Moriyama et al. ............... 347/5 |
| 2003/0202196 | A1* | 10/2003 | Ooki .............................. 358/1.9 |
| 2004/0156079 | A1* | 8/2004  | Marshall et al. ............ 358/3.21 |
| 2004/0169875 | A1* | 9/2004  | Yoshida et al. ............... 358/1.9 |
| 2005/0280857 | A1* | 12/2005 | Sugiyama et al. ........... 358/1.13 |
| 2006/0092435 | A1* | 5/2006  | Keithley ........................ 358/1.2 |
| 2006/0203270 | A1* | 9/2006  | Shirasawa .................... 358/1.9 |
| 2007/0146757 | A1* | 6/2007  | Tanaka et al. .............. 358/1.13 |
| 2007/0273910 | A1  | 11/2007 | Takahashi |

FOREIGN PATENT DOCUMENTS

| JP | 8090839    | 4/1996 |
| JP | 2004102585 | 4/2004 |

* cited by examiner

*Primary Examiner* — Vincent Rudolph
(74) *Attorney, Agent, or Firm* — Fitzpatrick, Cella, Harper & Scinto

(57) ABSTRACT

At the start of printing, it is determined whether binary rasterized data is available. If the binary rasterized data is available, execution of binary rasterization processing is designated. When generating print data based on binary data rasterized by binary rasterization processing, it is determined whether a printing apparatus can process binary rasterized data. If the printing apparatus cannot process binary rasterized data, binary rasterized data is processed to generate and output print data.

2 Claims, 4 Drawing Sheets

FIG. 2

| PRINT SETTINGS | |
|---|---|
| INK TYPE USED FOR PRINTING | PIGMENT INK ▽ |
| PRINT MEDIUM TYPE | GLOSSY PAPER ▽ |
| PRINT QUALITY | HIGH ▽ |
| PAPER SIZE | A4 ▽ |
| | OK    CANCEL |

PRINT CONTROL WITH SINGLE-BIT AND MULTI-BIT RASTERIZATION

BACKGROUND OF THE INVENTION

1. Field of the Invention

The present invention relates to a print control apparatus and print control method for generating print data based on rasterized data and outputting it to a printing apparatus, a program, and a storage medium.

2. Description of the Related Art

In general, a printer driver performs color correction and color conversion of color data from an application into color data printable by a printer. The printer driver quantizes the color data, and generates image data to be output to a printer. The printer driver receives R, G, and B (Red, Green, and Blue) color data from the application, and outputs C, N, Y, and K (Cyan, Magenta, Yellow, and blacK) color data to the printer. The printer driver is installed as software corresponding to each printer in a host computer, and performs print control processing in color printing under the control of an operating system (OS).

To speed up print control processing in color printing, the following method has already been proposed (see, e.g., patent reference 1: Japanese Patent Laid-Open No. 8-90839). More specifically, the printer driver directly generates print data from rasterized data generated from monochrome binary (1-bit) information when printing data formed from only black such as a character or line. This implements print control processing free from color processing and quantization, and increases the efficiency and speed of print control processing.

An inkjet printer often determines, from print setting information set at the start of printing, whether print control processing based on 1-bit rasterized data is available. Only when it is determined that this processing is available, the inkjet printer executes 1-bit rasterization.

Another method is to rasterize both RGB data and monochrome binary data and switch rasterized data in accordance with a rendering instruction (see, e.g., patent reference 2: Japanese Patent Laid-Open No. 2004-102585). However, it is determined whether 1-bit rasterized data is available.

The reason why it must be determined whether 1-bit rasterization is available is that it is convenient in the following cases to perform processing from RGB multilevel rasterized data even for data such as a black character or black line which can be rasterized into 1 bit:

(1) A case where print setting information represents a high black ink density and the amount of black ink discharge is decreased to prevent ink overflow on a print medium.

(2) A case where special processing is necessary to emphasize a black print result by discharging C, M, and Y inks over black ink.

As described above, a conventional printer driver determines the rasterization method based on print setting information set at the start of printing. A printer driver for a printer having a function of detecting the type of print medium also generally executes rasterization corresponding to print setting information after detecting the type of print medium. In general, the printer driver uses expected rasterized data. In other words, the printer driver does not receive rasterized data incompatible with a rasterization method designated by the printer driver at the start of printing. Upon receiving different rasterized data, most printer drivers stop print information processing.

As a system function, a function of switching between 1-bit rasterized data and RGB multilevel rasterized data is prepared even for print control processing using a spooler function on an OS on which the printer driver runs, and a module serving as the center of the printer driver. This function can increase the development efficiency of the printer driver and the efficiency and speed of driver processing.

However, the switching function of the system can be designated only at the start of print processing when speeding up print control processing using this switching function.

That is, high-speed processing can be achieved by validating the switching function at the start of printing and receiving 1-bit rasterized data by the printer driver. However, the switching function cannot be used in the following cases under limitations:

(1) A case where, even if a printer has a function of automatically detecting a print medium, and at the start of printing, setting information represents that 1-bit rasterized data is available, no 1-bit rasterized data can be used for the type of print medium automatically detected upon receiving rasterized data. For such a printer, the rasterized data switching function must be invalidated in advance.

(2) A case where a printer has a function of changing the density and color balance of a print result, and no setting information is applicable as the rasterized data switching function setting condition because the setting information is unique to the printer driver. If it cannot be determined at the start of printing whether to validate or invalidate the rasterized data switching function, the rasterized data switching function must be invalidated in advance.

SUMMARY OF THE INVENTION

The present invention provides a print control apparatus and print control method capable of efficiently performing print control processing using a rasterized data switching function.

According to one aspect of the present invention, there is provided a print control apparatus for generating print data based on rasterized data to be output to a printing apparatus, comprising: determination means for determining whether processing with 1-bit rasterized data is proper when generating print data based on 1-bit rasterized data generated in accordance with a print setting; and generation means for converting the 1-bit rasterized data to generate print data based on the converted rasterized data in a case where it is determined by the determination means that the processing with 1-bit rasterized data is not proper, and for generating print data based on the 1-bit rasterized data in a case where it is determined by the determination means that the processing with 1-bit rasterized data is proper.

According to another aspect of the present invention, there is provided a print control apparatus for generating print data based on rasterized data to output the print data to a printing apparatus, comprising: rasterization setting means for determining whether 1-bit rasterized data is available at the start of printing to designate execution of 1-bit rasterization processing in a case where 1-bit rasterized data is available; determination means for determining whether the printing apparatus can process 1-bit rasterized data when generating print data based on the 1-bit data rasterized by the 1-bit rasterization processing; and output means for converting the 1-bit rasterized data to generate and output print data in a case where the printing apparatus cannot process the 1-bit rasterized data.

According to still another aspect of the present invention, there is provided a print control method of generating print data based on rasterized data to be output to a printing apparatus, comprising the steps of: determining whether processing with 1-bit rasterized data is proper when generating print data based on 1-bit rasterized data generated in accordance with a print setting; and converting the 1-bit rasterized data to generate print data based on the converted rasterized data in a case where it is determined in the determining step that the processing with 1-bit rasterized data is not proper, and generating print data based on the 1-bit rasterized data in a case where it is determined in the determining step that the processing with 1-bit rasterized data is proper.

According to yet another aspect of the present invention, there is provided a print control method of generating print data based on rasterized data to output the print data to a printing apparatus, comprising the steps of: determining whether 1-bit rasterized data is available at the start of printing to designate execution of 1-bit rasterization processing in a case where 1-bit rasterized data is available; determining whether the printing apparatus can process 1-bit rasterized data when generating print data based on the 1-bit data rasterized by the 1-bit rasterization processing; and converting the 1-bit rasterized data to generate and output print data in a case where the printing apparatus cannot process the 1-bit rasterized data.

Further features of the present invention will become apparent from the following description of exemplary embodiments with reference to the attached drawings.

BRIEF DESCRIPTION OF THE DRAWINGS

FIG. 2 is a view showing a user interface window provided by a printer driver 103;

DESCRIPTION OF THE EMBODIMENT

A preferred embodiment of the present invention will be described in detail below with reference to the accompanying drawings.

Figure 1:
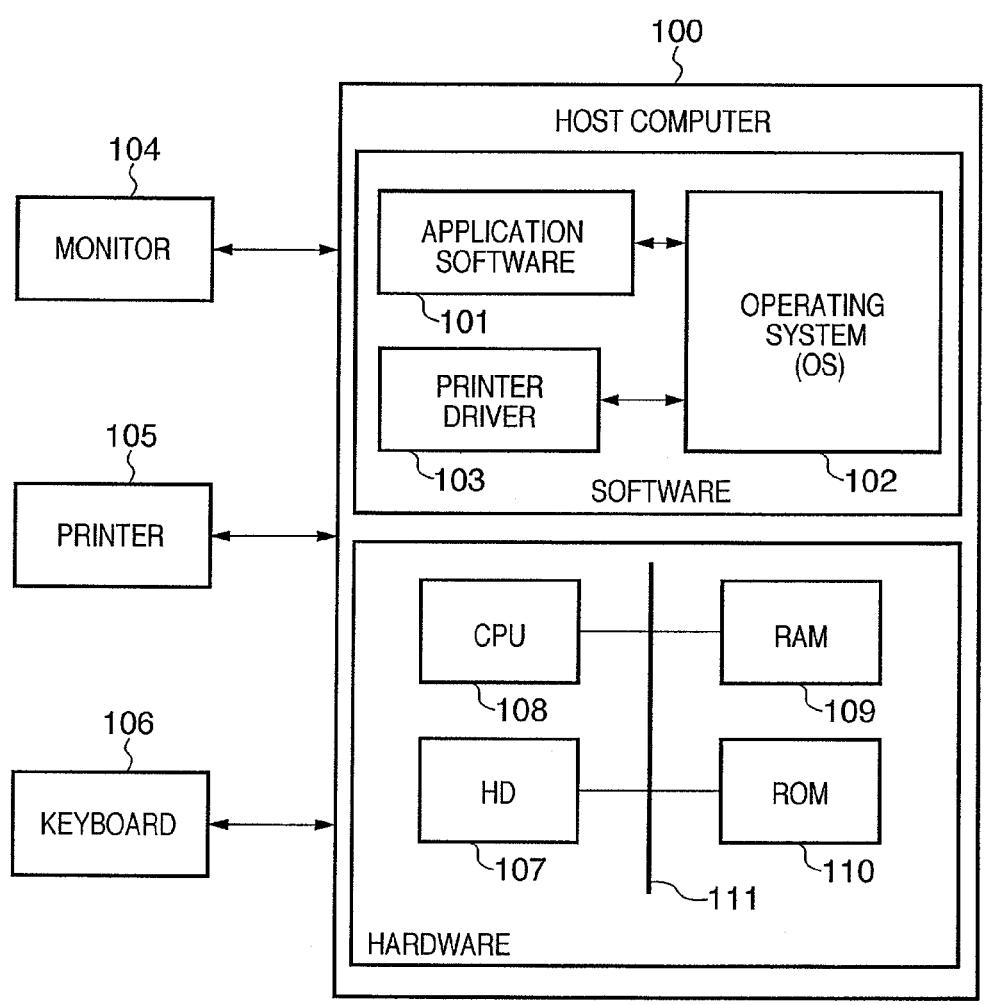
FIG. 1 is a block diagram showing a configuration of a printing system according to an embodiment.

FIG. 1 is a block diagram showing a configuration of a printing system according to the embodiment. As shown in FIG. 1, a printer 105 such as an inkjet printer, a monitor 104 such as an LCD, and a keyboard 106 are connected to a host computer 100. The host computer 100 comprises, as software, application software (to be referred to as an application hereinafter) 101, an operating system (OS) 102, and a printer driver 103.

The application 101 is, for example, word processing or spreadsheet software or an Internet browser. The OS 102 is a program serving as the basic system of the host computer 100. The OS 102 has a function (system spooler) of spooling a set of rendering instructions issued from the application 101 in order to output a page image. The printer driver 103 creates print data by processing various rendering instructions issued from the application 101 via the OS 102. The rendering instructions include a text rendering instruction, graphics rendering instruction, and image rendering instruction.

The host computer 100 comprises a CPU 108, hard disk (HD) 107, RAM 109, and ROM 110 as hardware for operating the above-described software programs. These hardware components are connected via a system bus 111. The hard disk 107 and RAM 109 store the above-described software programs.

The host computer 100 shown in FIG. 1 is a personal computer which adopts Microsoft Windows® as the OS 102 and incorporates an arbitrary application capable of printing. The monitor 104, printer 105, and keyboard 106 are connected to the personal computer.

The user activates the application 101 in the host computer 100 with the keyboard 106, and displays on the monitor 104 an image to be printed by the printer 105. The image includes text data such as a character classified into a text, graphics data classified into graphics, and image data classified into a natural image.

The user designates printing of an image displayed on the monitor 104, and then the application 101 requests the OS 102 to print it out. The application 101 issues, to the OS 102, a text rendering instruction for text data of the image, a graphics rendering instruction for graphics data, and an image rendering instruction for image data.

The OS 102 spools the rendering instructions. Upon receiving an output request from the application 101, the OS 102 issues a print request and rendering instructions to the printer driver 103 corresponding to the printer 105.

The printer driver 103 processes the print request and rendering instructions input from the OS 102. When the printer 105 is, for example, a raster printer, this processing is to rasterize rendering instructions from the OS 102 sequentially for each band in an RGB 24-bit page memory. The printer driver 103 converts the rasterized data into a data format printable by the printer 105, for example, CMYK data, and transfers it to the printer 105.

A page image stored in the RGB 24-bit page memory is generally divided into band images, and each band image is processed.

Image processing by the printer driver 103 will be explained. The printer driver 103 mainly executes the following two image processes:

(1) Rasterization Processing

The printer driver 103 generates raster data such as RGB or CMYK data corresponding to the resolution of the printer 105 from a rendering instruction based on color information before and after printer color processing (to be described later). The printer driver 103 sequentially stores the generated data in the page memory.

(2) Printer Color Processing

The printer driver 103 performs luminance/density conversion processing, masking processing, gamma processing, and N-valued processing for RGB raster data. The printer driver 103 converts the RGB raster data into CMYK data corresponding to C, M, Y, and K inks used by the printer 105.

As the image quality of the printer is improved, processing (2) becomes complicated and takes a long time. However, a printer capable of rendering monochrome data simply in black/white need not execute complicated color processing. Thus, after generating 1-bit monochrome rasterized data by rasterization processing (1), the printer driver 103 can skip processing (2), directly convert the rasterized data into print data for controlling the printer, and transmit the print data to the printer.

As a system function, a function of switching between 1-bit rasterized data and RGB multilevel rasterized data is prepared even for print control processing using a spooler function on an OS on which the printer driver runs, and a module serving as the center of the printer driver. This function can increase the efficiency and speed of driver processing.

A method of speeding up driver processing by the printer driver 103 using the switching function of the system (OS 102) will be explained with reference to FIGS. 2 and 3.

FIG. 2 is a view showing a user interface window provided by the printer driver 103. The user interface window shown in FIG. 2 is used to make print settings at the start of printing.

The user can set "ink type used for printing, print medium type, print quality, and paper size" via the user interface window.

Figure 3:
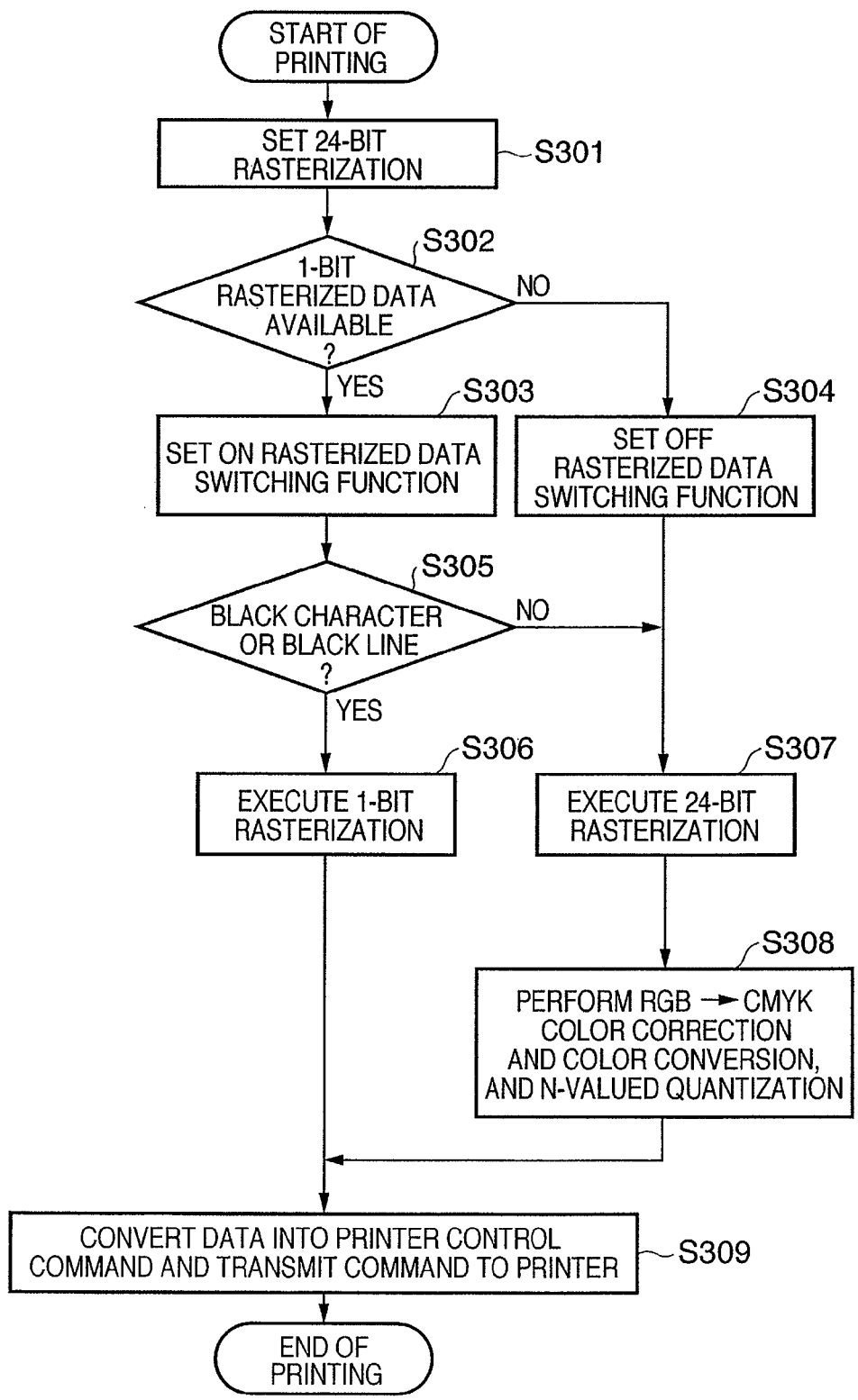
FIG. 3 is a flowchart showing print control processing by the printer driver 103.

FIG. 3 is a flowchart showing print control processing by the printer driver 103. In step S301, the printer driver 103 sets 24-bit rasterization in the system so as to convert rasterized data into 8-bit data for each of R, G, and B. In step S302, the printer driver 103 determines whether print settings allow application of black ink in 100%, in accordance with a paper type acquired from the printer, and a combination of the ink type used for printing, paper, quality, and the like which are set via the user interface window shown in FIG. 2.

If the printer driver 103 determines that black ink can be applied at 100% (for example, the paper type acquired from the printer is plain paper and the quality setting is "standard"), the process advances to step S303 to set ON the rasterized data switching function. If black ink cannot be applied at 100% (for example, the paper type acquired from the printer is special-purpose paper such as glossy paper), the process advances to step S304 to set OFF the rasterized data switching function.

In steps S301 to S304, the setting of the rasterized data switching function in the system is initialized based on print settings made via the user interface window of the printer driver 103 at the start of printing.

If the switching function is set ON in steps S301 to S304, the process advances to step S305. In step S305, the system determines whether the rendering instruction targets only a black character or black line, that is, is formed from only black data (R=0, G=0, and B=0) or white data (R=255, G=255, and B=255) for 8-bit data of each color. If the system determines that the rendering instruction targets only a black character or black line, the process advances to step S306 to execute 1-bit rasterization for monochrome binary data.

As a result of this 1-bit rasterization, each pixel is expressed by 1 bit (binary). For example, "0" represents a bit corresponding to a black pixel, and "1" represents one corresponding to a white pixel. The printer driver 103 receives 1-bit rasterized data from the system, and the process advances to step S309. The printer driver 103 need not perform any of color correction and color conversion from RGB to CMYK, and N-valued quantization, and can speed up print control processing.

If the switching function is set to OFF in steps S301 to S304, or the rendering instruction does not target only a black character or black line in step S305, the process advances to step S307. In step S307, 24-bit RGB rasterization is executed. In this case, respective pixels are expressed by 8 bits (256 tone levels of 0 to 255) for each of R, G, and B.

In step S308, the printer driver 103 executes color correction and color conversion from RGB to CMYK based on the 24-bit rasterized data received from the system. Then, the printer driver 103 performs N-valued quantization, and the process advances to step S309.

In step S309, the printer driver 103 converts the 1-bit rasterized data or quantized data into a printer control command for printing by the printer 105, and transmits the command to the printer 105.

By setting the switching function ON, the printer driver 103 suffices to directly convert rasterized data into a printer control command and transmit the command to the printer without performing any of color correction, color conversion, and N-valued processing. The printer driver 103 can achieve processing at high speed.

However, the switching function is set under a limitation that it must be designated at the start of print processing, and a limitation that validation/invalidation of the function must be designated in accordance with a format prepared in the system in advance.

For this reason, the following problem arises in a printer having a "medium detection function" of automatically determining the type of paper set in the printer and performing print processing. That is, when the paper type is detected after the start of print processing, 1-bit rasterized data may not be able to be used for the detected medium even if 1-bit rasterized data is available before the start of printing. In this case, the rasterization switching function must always be set to be invalid.

To maximize the rasterization switching function prepared in the system, the embodiment adds determination processing to determine whether 1-bit rasterized data is available after performing 1-bit rasterization.

The sequence of print control processing according to the embodiment to which the determination processing is added will be explained with reference to FIG. 4.

Figure 4:
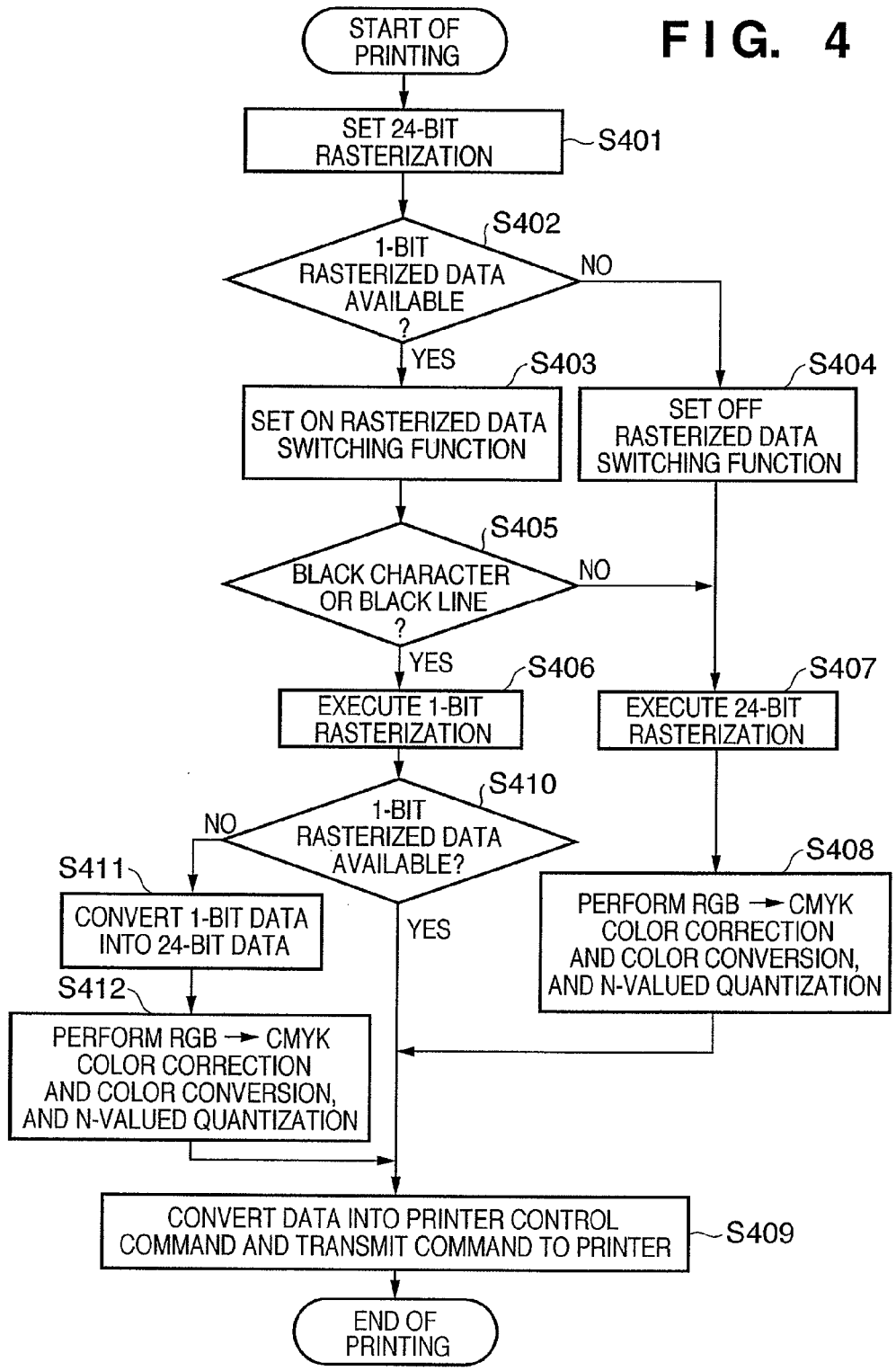
FIG. 4 is a flowchart showing print control processing by the printer driver 103.

FIG. 4 is a flowchart showing print control processing by the printer driver 103. In step S401, the printer driver 103 sets 24-bit rasterization in the system so as to convert rasterized data into 8-bit data for each of R, G, and B. In step S402, the printer driver 103 determines whether print settings allow application of black ink in 100%, in accordance with a combination of the ink type used for printing, paper, quality, and the like which are set via the user interface window shown in FIG. 2. Print settings which allow application of black ink at 100% are, for example, paper "plain paper" and quality "standard", or paper "plain paper" and quality "quick". Print settings which inhibit applying black ink at 100% are, for example, paper "plain paper" and quality "high", paper "glossy paper", or paper "pro photo paper".

If the printer driver 103 determines that black ink can be applied at 100%, the process advances to step S403 to set ON the rasterized data switching function. If black ink cannot be applied at 100%, the process advances to step S404 to set OFF the rasterized data switching function.

In steps S401 to S404, the setting of the rasterized data switching function in the system is initialized based on print settings made via the user interface window of the printer driver 103 at the start of printing.

If the switching function is set to ON in steps S401 to S404, the process advances to step S405. In step S405, the system determines whether the rendering instruction targets only a black character or black line, that is, it is formed from only black data (R=0, G=0, and B=0) or white data (R=255, G=255, and B=255) for 8-bit data of each color. If the system determines that the rendering instruction targets only a black character or black line, the process advances to step S406 to execute 1-bit rasterization for monochrome binary data.

In step S410, upon receiving the 1-bit rasterized data from the system, the printer driver 103 receives print medium information from the printer 105, and determines again from the information whether 1-bit processing is possible. If the printer 105 has detected special-purpose paper (e.g., glossy paper) as a print medium by the medium detection function, the printer driver 103 determines that 1-bit rasterized data is not available because 1-bit rasterized data cannot achieve high-quality printing. Then, the process advances to step S411. In step S411, the printer driver 103 converts the 1-bit rasterized data into 8-bit rasterized data for each of R, G, and B. In step S412, similar to step S408, the printer driver 103 executes color correction, color conversion, and then N-valued quantization. Thereafter, the process advances to step S409.

If the printer 105 can use 1-bit rasterized data in step S410 (for example, plain paper is detected), the process directly advances to step S409.

A case where four color inks of black pigment K, yellow dye Y, magenta dye M, and cyan dye C are used as printer inks will be explained. In step S406, 1-bit rasterization is executed in accordance with the plain paper setting made by the user via the driver. In step S410, if paper informed from the printer is glossy paper and it is determined that 1-bit processing is not proper, the printer driver 103 converts 1-bit monochrome (black pigment) data into 24-bit RGB data. In step S412, the printer driver 103 corrects the color of the converted RGB data, converts the 24-bit RGB data into Y (yellow dye), M (magenta dye), and C (cyan dye) data, and quantizes them. The reason why these processes are done is that the quality may become poor upon printing on special-purpose paper (e.g., glossy paper) in black using black pigment ink because the ink does not permeate well. The quality is improved by printing in black using Y, M, and C dye inks.

A case where five color inks of black pigment K, yellow dye Y, magenta dye M, cyan dye C, and black dye K are used as printer inks will be explained. In step S406, 1-bit rasterization is executed in accordance with the plain paper setting made by the user via the driver. In step S410, if paper informed from the printer is glossy paper and it is determined that 1-bit processing is not proper, the printer driver 103 converts 1-bit monochrome (black pigment) data into 24-bit RGB data. In step S412, the printer driver 103 corrects the color of the converted RGB data, converts the 24-bit RGB data into Y (yellow dye), M (magenta dye), C (cyan dye), and K (black dye) data, and quantizes them. The reason why these processes are done is that the quality may become poor upon printing on special-purpose paper (e.g., glossy paper) in black using black pigment ink because the ink does not permeate well. The quality is improved by printing in black using Y, M, C, and K dye inks.

In step S411, 1-bit data may also be converted directly into YMC(K) data without converting 1-bit data into 24-bit RGB data.

As a result of this 1-bit rasterization, each pixel is expressed by 1 bit (binary). For example, "0" represents a bit corresponding to a black pixel, and "1" represents one corresponding to a white pixel. The printer driver 103 receives 1-bit rasterized data from the system, and the process advances to step S409. The printer driver 103 need not perform any of color correction and color conversion from RGB to CMYK, and N-valued quantization, and can speed up print control processing.

If the switching function is set to OFF in steps S401 to S404, or the rendering instruction does not target only a black character or black line in step S405, the process advances to step S407. In step S407, 24-bit RGB rasterization is executed. In this case, respective pixels are expressed by 8 bits (256 tone levels of 0 to 255) for each of R, G, and B.

In step S408, the printer driver 103 executes color correction and color conversion from RGB to CMYK based on the 24-bit rasterized data received from the system. After that, the printer driver 103 performs N-valued quantization. Then, the process advances to step S409.

In step S409, the printer driver 103 converts the 1-bit rasterized data or quantized data into a printer control command for printing by the printer 105, and transmits the command to the printer 105.

By setting the switching function ON, the printer driver 103 suffices to directly convert rasterized data into a printer control command and transmit the command to the printer without performing any of color correction, color conversion, and N-valued processing. The printer driver 103 can achieve processing at high speed.

It is effective to execute the determination at the timing of S406 shown in FIG. 4 when paper information cannot be acquired from the printer at the timing of S302 shown in FIG. 3 but can be acquired after the start of printing owing to system specifications. In many cases, plain paper is set in a printer at the plain paper setting. Data can be processed for each bit on the basis of the setting to execute print processing at high speed. In some rare cases, however, the user makes the plain paper setting, but no plain paper is set in a printer. In this case, data processed for each bit is converted into 24-bit data to properly perform processing though the speed decreases.

In this way, upon receiving 1-bit rasterized data, it is determined again whether 1-bit rasterized data is available. If no 1-bit rasterized data is available, rasterized data is converted again, obviating the need to set the rasterization switching function again.

Hence, the switching function can be set valid even when the print setting status changes between the timing when printing starts and that when rasterized data is acquired, in a printer having the medium detection function or the like. In most printing situations such as normal document printing, 1-bit rasterization effective for increasing the processing speed can be executed preferentially.

In the embodiment, processing assumes that one page is formed from one band. The present invention is also applicable to a case where a page is divided into a plurality of bands. In this case, it is determined for each band whether 1-bit rasterized data is available.

The present invention may be applied to a system including a plurality of devices (e.g., a host computer, interface device, reader, and printer) or an apparatus (e.g., a copying machine or facsimile apparatus) formed by a single device.

The object of the present invention is also achieved by supplying a storage medium which stores software program codes for implementing the functions of the above-described embodiment to a system or apparatus, and reading out and executing the program codes stored in the storage medium by the computer (or the CPU or MPU) of the system or apparatus.

In this case, the program codes read out from the storage medium implement the functions of the above-described embodiment, and the storage medium which stores the program codes constitutes the present invention.

The storage medium for supplying the program codes includes a flexible disk, hard disk, optical disk, magnetooptical disk, CD-ROM, CD-R, magnetic tape, nonvolatile memory card, and ROM.

The functions of the above-described embodiment are implemented when the computer executes the readout program codes. Also, the present invention includes a case where an OS (Operating System) or the like running on the computer performs some or all of actual processes based on the instructions of the program codes and thereby implements the functions of the above-described embodiment.

Furthermore, the present invention includes the following case. That is, the program codes read out from the storage medium are written to the memory of a function expansion board inserted into the computer or the memory of a function expansion unit connected to the computer. Then, the CPU of the function expansion board or function expansion unit performs some or all of actual processes based on the instructions of the program codes, thereby implementing the functions of the above-described embodiment.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-289200, filed Oct. 24, 2006, which is hereby incorporated by reference herein in its entirety.

What is claimed is:

1. A printing control apparatus which creates print data based on rendering instructions and transmits the created print data to a printer, comprising:
   a display unit that displays a print setting screen;
   a first determination unit that determines whether 1-bit rasterization processing is available or not based on a print setting set by a user on the displayed print setting screen;
   a setting unit that makes available a switching function for switching a rasterization processing when the 1-bit rasterization processing is determined to be available by the first determination unit based on the print setting, and that makes unavailable the switching function when the 1-bit rasterization processing is determined to not be available by the first determination unit based on the print setting;
   an execution unit that executes the 1-bit rasterization processing in accordance with the rendering instructions; and
   a second determination unit that determines whether the rendering instructions for which the 1-bit rasterization processing has been executed is used by the printer,
   wherein the execution unit executes a multi-bit rasterization processing for the rendering instructions without the determination by the second determination unit and transmits the multi-bit rasterized data to the printer when the switching function has been made unavailable,
   wherein the execution unit further executes a multi-bit rasterization processing for the rendering instructions for which the 1-bit rasterization processing has been executed and transmits the multi-bit rasterized data to the printer when the second determination unit determines that the rendering instructions are instructions for rendering a monochromatic image and a print medium which cannot be printed with the rendering instructions for which 1-bit rasterization processing has been executed based on information about a print medium detected by a medium detection function of the printer, and
   wherein the execution unit does not execute the multi-bit rasterization processing for the rendering instructions for which the 1-bit rasterization processing has been executed and transmits the 1-bit rasterized data to the printer when the second determination unit determines that the rendering instructions are instructions for rendering a monochromatic image and a print medium which can be printed with the rendering instructions for which 1-bit rasterization processing has been executed based on information about a print medium detected by a medium detection function of the printer.

2. The apparatus according to claim 1, wherein the multi-bit rasterization processing includes processing for converting 1-bit rasterized data in black into rasterized data in yellow, magenta and cyan and processing for N-valued quantization of the converted rasterized data.

* * * * *